(12) United States Patent
Papadakis et al.

(10) Patent No.: US 10,753,799 B2
(45) Date of Patent: Aug. 25, 2020

(54) SPECTRAL CAMERA HAVING INTERCHANGEABLE FILTERS

(71) Applicant: XPECTRALTEK, LDA, Braga (PT)

(72) Inventors: Vasileios Papadakis, Heraklion (GR); Carlos Aguiar Campos, Braga (PT)

(73) Assignee: XPECTRALTEK, LDA, Braga (PT)

( * ) Notice: Subject to any disclaimer, the term of this patent is extended or adjusted under 35 U.S.C. 154(b) by 0 days.

(21) Appl. No.: 16/311,799

(22) PCT Filed: Jun. 22, 2017

(86) PCT No.: PCT/IB2017/053746
§ 371 (c)(1),
(2) Date: Dec. 20, 2018

(87) PCT Pub. No.: WO2017/221203
PCT Pub. Date: Dec. 28, 2017

(65) Prior Publication Data
US 2019/0204152 A1    Jul. 4, 2019

(30) Foreign Application Priority Data
Jun. 22, 2016   (PT) .......................... 109481

(51) Int. Cl.
*G01N 21/25*    (2006.01)
*G01J 3/28*     (2006.01)
(Continued)

(52) U.S. Cl.
CPC ........... *G01J 3/2823* (2013.01); *G01J 1/0403* (2013.01); *G01J 1/0492* (2013.01); *G01J 1/22* (2013.01); *G01J 3/0202* (2013.01); *G01J 3/0208* (2013.01); *G01J 3/0256* (2013.01); *G01J 3/12* (2013.01); *G01J 3/32* (2013.01); *G02B 5/281* (2013.01); *G02B 5/283* (2013.01);
(Continued)

(58) Field of Classification Search
CPC .......... G01J 3/2823; G01J 1/0403; G01J 3/12; G01J 3/32; G01J 1/22; G01J 3/0208; G01J 3/0256; G01J 3/0202; G01J 1/0492; G01J 2003/1226; G01J 2003/2826; G01J 2003/1221; G03B 17/14; G02B 5/283; G02B 5/281; G02B 26/008
See application file for complete search history.

(56) References Cited

U.S. PATENT DOCUMENTS 3,492,478 A * 1/1970 Smith ..................... G06K 7/12
                                                  250/271
4,082,464 A   4/1978 Johnson, Jr.
(Continued)

FOREIGN PATENT DOCUMENTS

JP   S53107383 A   9/1978
JP   S624202      1/1989
(Continued)

*Primary Examiner* — Abdullahi Nur
(74) *Attorney, Agent, or Firm* — Leason Ellis LLP

(57) ABSTRACT

The present disclosure relates to a spectral camera, in particular to a spectral camera having multiple filters mounted interchangeably within the optical path of the camera. It is disclosed a spectral camera having a plurality of spectral filters arranged around a cylindrical support, thus providing a filter carrousel, wherein the image sensor is placed within said carrousel.

18 Claims, 4 Drawing Sheets

(51) Int. Cl.
*G01J 1/04* (2006.01)
*G01J 3/02* (2006.01)
*G02B 26/00* (2006.01)
*G01J 1/22* (2006.01)
*G01J 3/32* (2006.01)
*G01J 3/12* (2006.01)
*G02B 5/28* (2006.01)
*G03B 17/14* (2006.01)

(52) U.S. Cl.
CPC ............ *G02B 26/008* (2013.01); *G03B 17/14* (2013.01); *G01J 2003/1221* (2013.01); *G01J 2003/1226* (2013.01); *G01J 2003/2826* (2013.01)

(56) References Cited

U.S. PATENT DOCUMENTS 8,081,231 B2    12/2011   Kikuchi
8,466,964 B2     6/2013   Gat et al.

FOREIGN PATENT DOCUMENTS

| JP | S6424202 A | 1/1989 |
| WO | 9404893 A1 | 3/1994 |
| WO | 0064342 | 11/2000 |

* cited by examiner

SPECTRAL CAMERA HAVING INTERCHANGEABLE FILTERS

CROSS-REFERENCE TO RELATED PATENT APPLICATIONS

This application is a U.S. National Stage Application under 35 U.S.C. § 371 of International Patent Application No. PCT/IB2017/053746, filed 22 Jun. 2017, which claims the benefit of priority under 35 U.S.C. Section 119(e) of Portuguese Patent Application number 109481 filed 22 Jun. 2016, which are hereby incorporated by reference as if set forth in their respective entireties herein.

TECHNICAL FIELD

The present disclosure relates to a spectral camera, in particular to a spectral camera having multiple filters mounted interchangeably within the optical path of the camera.

BACKGROUND

Document WO9404893 discloses a spectrometer with flexible filters mounted within a rotating cylinder. One or more filters may then be mounted within the circumference of a cylinder. One or more said cylinders may be stacked for further filters being made available. Mounting is accomplished by flexing a planar filter into an arcuate shape and then fitting the filter into a curved slot in the cylindrical frame. There are means disclosed for receiving an incident beam from a direction parallel to the axis of the filter cylinder. There are also means disclosed for rotating said filter cylinder.

In document WO9404893, the incident light beam enters the filter cylinder parallel to the cylinder axis and mirrors are required within the cylinder for reflecting light onto the filters, causing a construction that is not compact and does not allow straightforwardly the use of interchangeable lenses.

In fact, document WO9404893 does not disclose any specific focusing arrangements or lens assemblies in general.

These facts are disclosed in order to illustrate the technical problem addressed by the present disclosure.

GENERAL DESCRIPTION

It is disclosed a spectral camera having a plurality of spectral filters arranged around a cylindrical support, thus providing a filter carrousel, wherein the image sensor is placed within said carrousel.

During operation the filter carrousel is rotated, allowing different filters to pass between the focusing optics and the image sensor, allowing a range of different wavelengths to be scanned according to each specific filter. By rotating the carrousel quickly and in synchronization with the capture of images, the camera is able to obtain multispectral images quickly and in a compact construction. Obviously, the time necessary for capturing each image depends on many factors, e.g. how bright is the image, what is the desired image capture speed, among others.

Having a compact construction allows the inclusion of further elements, like a laser pointer, within the body of the camera and allows a high integration of electronics and mechanics, namely the use of a single cable combining power and data, or the use of a single electronic hub inside the camera for connecting the electronic parts. The carrousel filter may preferentially be monochromators, in particular having split spectrum frequencies among the carrousel filters.

It is disclosed a spectral camera comprising:
an image sensor;
a camera lens;
a rotatable filter carrousel comprising a plurality of spectral filters arranged around a cylindrical surface;
wherein the image sensor is arranged within the filter carrousel to capture images incident through one of the spectral filters, said spectral filter being interchangeable by rotation of the filter carrousel.

In an embodiment, the interchangeable spectral filter is placed in the optical path of the camera between the image sensor and the camera lens.

In an embodiment, the camera lens is interchangeable and is placed outside the filter carousel.

An embodiment comprises a camera lens mount placed outside the filter carousel for interchangeably mounting the camera lens, in particular the camera lens mount being a C-mount.

In an embodiment, the spectral filters are arranged tangentially around the cylindrical surface.

In an embodiment, the spectral filters are fixed within individual niches or holes of the cylindrical surface by a filter stop. This allows filters to be replaced easily. The total filter set can be customized based on the requirements of each spectral camera application.

An embodiment comprises a motor for rotating the filter carrousel.

In an embodiment, the motor is configured for rotating the filter carrousel at a constant rotational speed.

In an embodiment, the motor is configured for rotating the filter carrousel in a stepwise, filter by filter, motion.

An embodiment comprises a rotary encoder for providing the angular position of the filter carrousel.

In an embodiment, the spectral camera is configured to capture in synchronization one image for each of the spectral filters as the filter carrousel rotates.

An embodiment comprises an optical sensor or rotary encoder for determining the rotational angle of the filter carrousel for synchronizing the image capture with each of the spectral filters as the filter carrousel rotates.

In an embodiment, the camera lens is an assembly of optical lenses.

In an embodiment, the spectral filters are interference filters.

In an embodiment, the filter carrousel comprises 10 or more spectral filters, in particular 20 or more spectral filters, further in particular 30 or more spectral filters.

An embodiment comprises a laser pointer for aiding in pointing the camera at a target.

An embodiment comprises bandpass interference spectral filters covering the full UV-VIS-NIR range, 350 nm-1200 nm.

An embodiment comprises comprising bandpass interference spectral filters covering the sensitivity spectral range of the image sensor.

The disclosure provides, namely, the following advantages:
Cost effective solution.
Robust, fast, accurate and automated solution.
User friendly solution (portable, light weight, no external power, easy user interface).
Wide wavelength sensitivity range (e.g. from 350 nm UV to 1200 nm NIR).

High spatial resolution (5 MPixel with the capability to go up to 10 MPixels or more).

High number of filters (e.g. 30) that cover all the sensitivity range of the sensor.

Continuous acquisition from each filter.

C-mount compatible (can connect to a microscope up to a telescope).

Complete and user friendly acquisition software.

According to an embodiment, the disclosure describes the following optical path from target to captured image:

The light from the scene is collected by the objective lens.

The objective lens is coupled via the C-mount interface.

Different objective lenses can be used that are based on C-mount interface.

Light is monochromatized by each of the interference filters in place.

Filters can be exchanged by rotation of the filter wheel.

The correct filter is selected by the filter wheel position.

BRIEF DESCRIPTION OF THE DRAWINGS

The following figures provide preferred embodiments for illustrating the description and should not be seen as limiting the scope of invention.

DETAILED DESCRIPTION

The following preferred embodiments are embodiments of the disclosure and serve to illustrate and should not be seen as limiting the scope.

Figure 1:
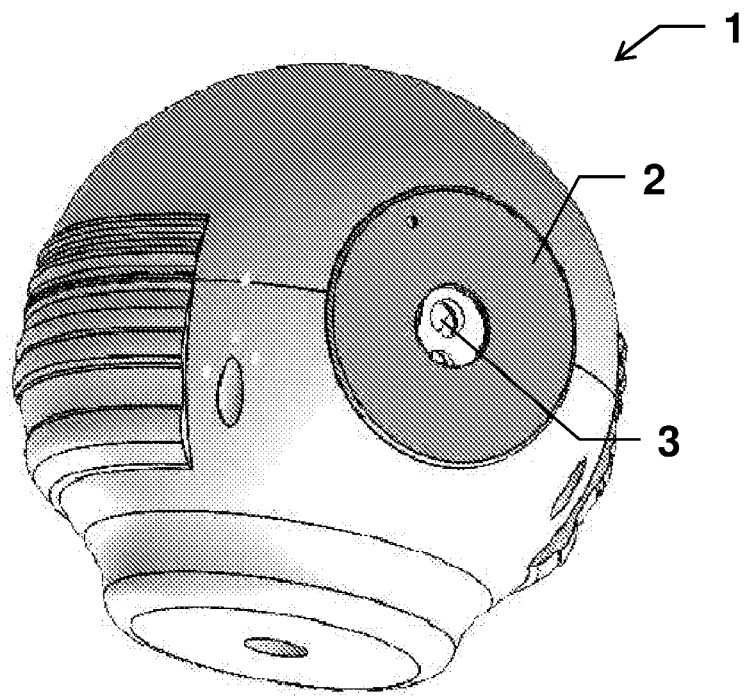
FIG. 1: Schematic representation of an embodiment of the exterior of the spectral camera.

FIG. 1 shows a schematic representation of an embodiment of the exterior of the spectral camera 1 showing an aperture 3 for receiving incoming light and a camera lens mount 2.

Figure 2:
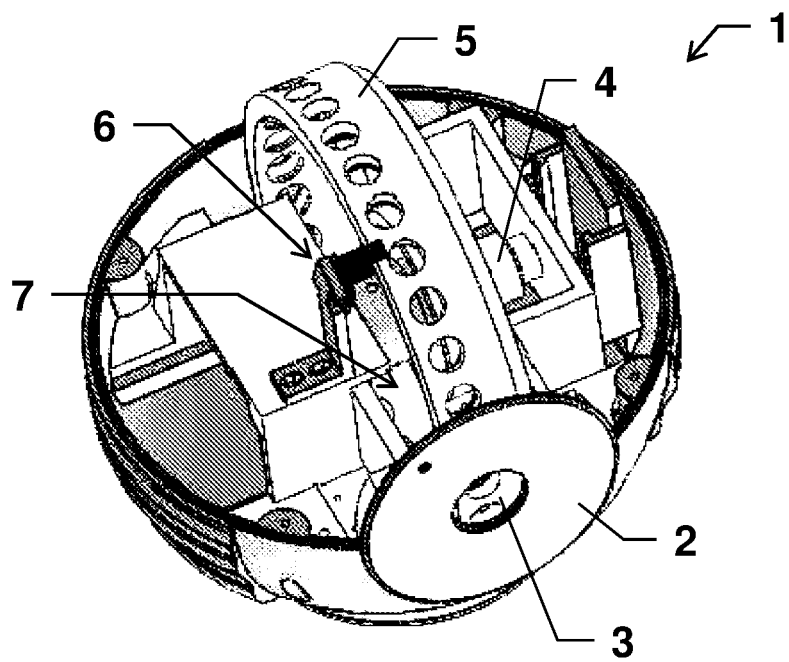
FIG. 2: Schematic representation of an embodiment of the interior of the spectral camera.

FIG. 2 shows a schematic representation of an embodiment of the interior of the spectral camera 1 showing a camera lens mount 2, an aperture 3 for receiving incoming light, a motor 4 for rotating the filter carrousel, the filter carrousel 5, an optical position sensor 6 and an image sensor 7.

Figure 3:
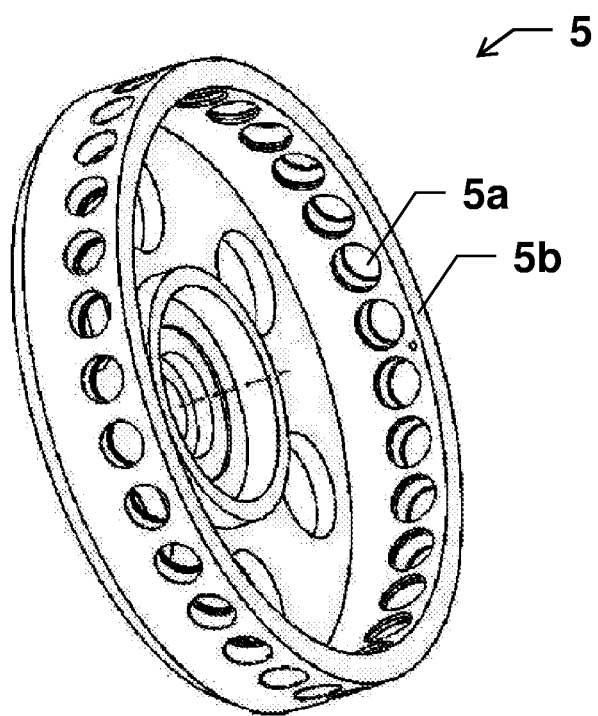
FIG. 3: Schematic representation of an embodiment of the filter carrousel.

FIG. 3 shows a schematic representation of an embodiment of the filter carrousel 5 comprising a cylindrical support 5b having a plurality of filters 5a arranged tangentially around the cylindrical surface of said cylindrical support 5b.

Figure 4:
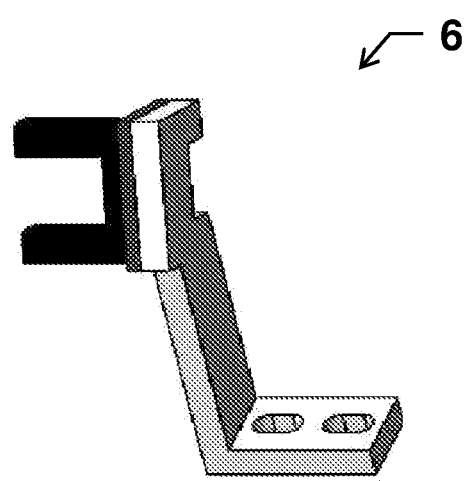
FIG. 4: Schematic representation of an embodiment of the optic sensor and respective support.

FIG. 4 shows a schematic representation of an embodiment of the optic sensor 6 and respective support, which is used for determining the position of the carrousel with precision. Alternatively, a rotary encoder coupled to the carrousel or to the motor can be used for determining the position of the carrousel with precision. In a further alternative, a stepper motor could be used whose movement is deterministic, within normal operation limits, and allows its position to be known from the controls it has received.

Figure 5:
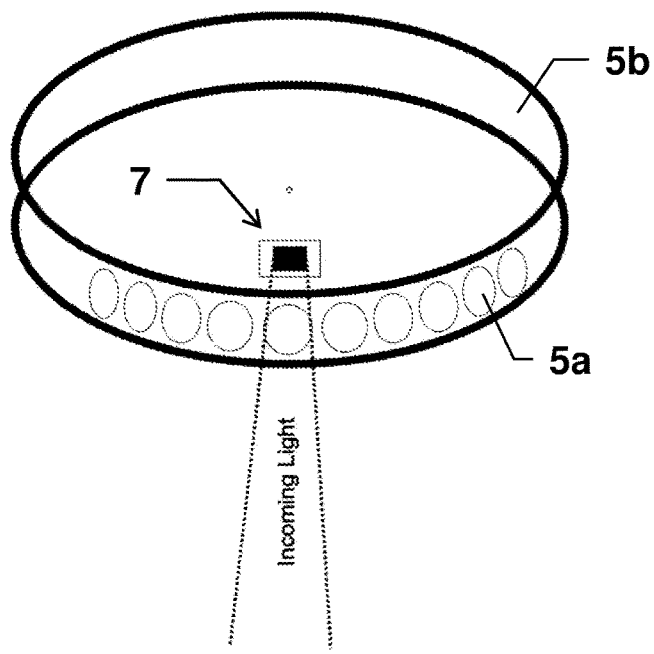
FIG. 5: Schematic representation of an embodiment with an overall part arrangement.

FIG. 5 shows a schematic representation of an embodiment with an overall part arrangement of the filter carrousel comprising a cylindrical support 5b having a plurality of filters 5a arranged tangentially around the cylindrical surface of said cylindrical support 5b, and an image sensor 7.

Figure 6:
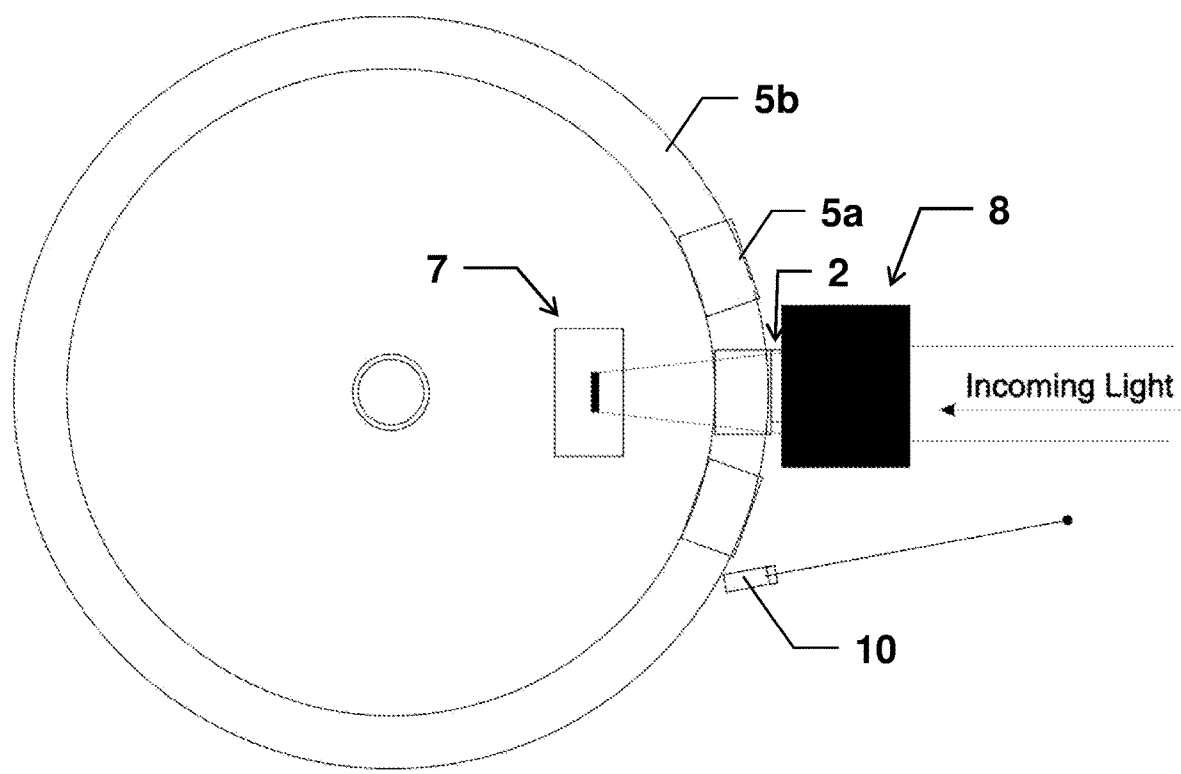
FIG. 6: Schematic representation of an embodiment with a detailed part arrangement.

FIG. 6 shows a schematic representation of an embodiment with a detailed part arrangement the spectral camera showing a camera lens mount 2, a mountable lens 8 for receiving incoming light, the filter carrousel support 5b and individual filters 5a, an image sensor 7 and a laser pointer 10 for aiding in pointing the camera at a target.

Figure 7:
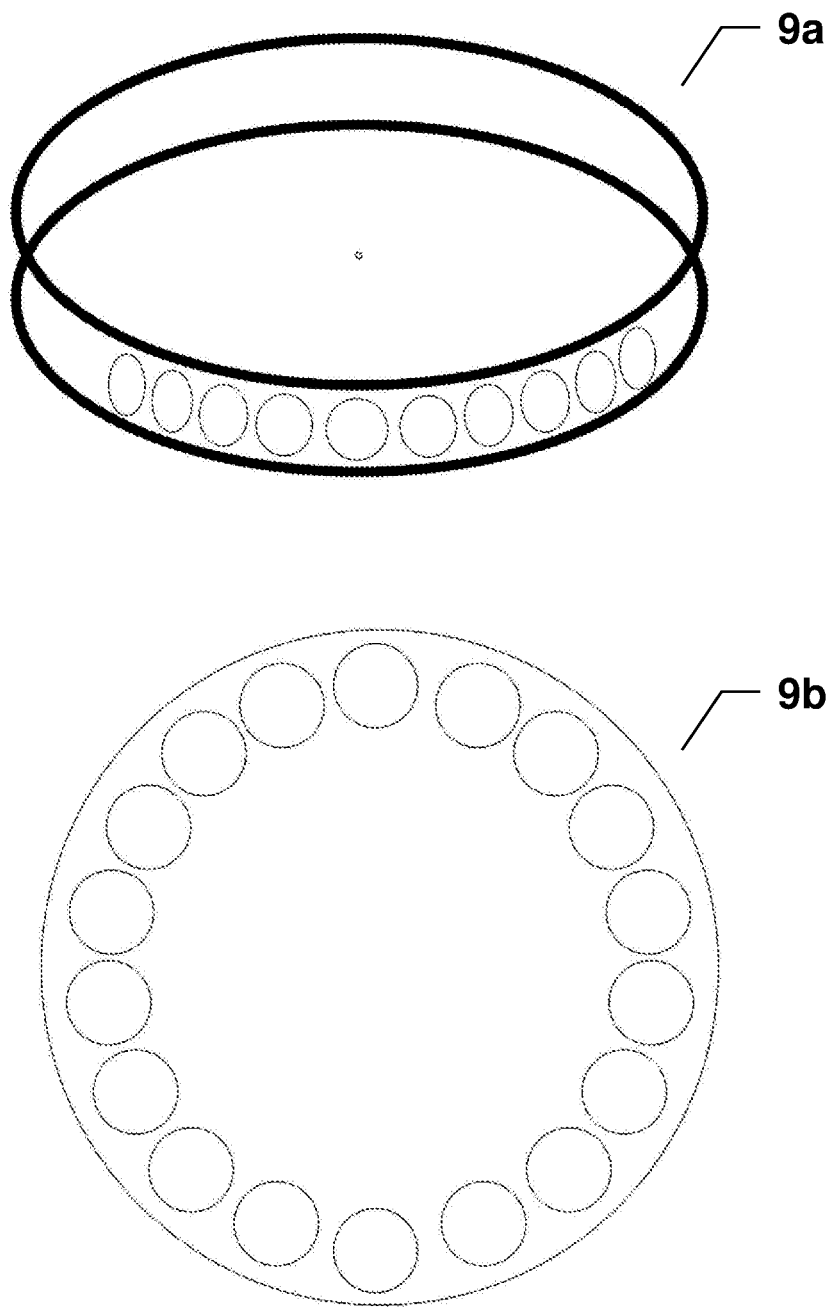
FIG. 7: Schematic representation of a comparison between a disc arrangement and a cylinder arrangement for placement of the filters.

FIG. 7 shows a schematic representation of a comparison between a disc arrangement 9a and a cylinder arrangement 9b for placement of the filters, wherein it can be appreciated how the cylindrical shape allows a much tighter placement of the filters. Thus, a spectral camera having more filters is feasible for the same size of camera of a disc embodiment. Alternatively, a camera having the same number of filters can be made smaller.

The compact construction of the camera allows the inclusion of a laser pointer within the main body of the camera. The compact construction having the image sensor within a filter carrousel also allows that an interchangeable lens mount and interchangeable lens can be used outside the carrousel, providing an even more practical and flexible device.

The disclosed spectral camera has further advantages, namely:

It can operate with a single cable or without external power, by having a compact construction.

It can access a large amount of filters in a simple, robust and fast way. This selection of filters is very accurate with full control of the running position.

It can project a point in the field of view of the camera to allow users an easy understanding of the area that the camera is looking at.

Advantageously, the camera may be connected through an USB cable or other small peripheral connector providing both data and power connections (e.g. Thunderbolt, Firewire, etc).

In a preferred embodiment, the light that is approaching the sensor is filtered through the various interference filters that are located on the filter wheel before being acquired by the sensor. The acquired images are then pre-processed to remove the thermal (dark) noise of the sensor and stored to HDD. Following this, a normalization methodology is performed that allows three corrections to occur (Normalization in spectrum, eliminating the illumination inhomogeneities, correct for the possible dirt that is gathered in the optical path and on the sensor).

The software is used to complete the hardware as a control methodology as also as a calibration and normalization solution. The acquired data are very large and difficult to handle, making it impossible to process/analyze them without specially designed software. The acquisition application also contains innovative solutions for the correct acquisition of the images. It is the simplest possible that allows imaging with the largest possible window, losing only a small part of the maximum screen size due to the menu bar. In a menu bar the user can find the most commonly used variables, like shutter time and filter selection. Saving, defining the project name, change of digital magnification and camera controls can be found there too.

In a preferred embodiment, the image sensor is CMOS (e.g. 5 MPixel, 12 bit). The sensor is preferably chosen to have the widest sensitivity range possible to expand the acquisition capabilities of the system. Further, it requires sufficiently high spatial resolution and high dynamic range for analytic operation.

In a preferred embodiment, the number of filters is preferably 30 or around 30. This number of filters and the specific wavelength selection was chosen based on the spectral characteristics of the pigments and chromophores. This is due to their absorption/reflectance characteristics that start to be sharp close to the UV and get smoother as we approach the NIR. The selection of the filters used in this solution are chosen based on the general absorption characteristics of pigments and chromophores. In the ultraviolet part of the spectrum, the filters have a FWHM of 10 nm and a step between the bands of 10 nm (350, 360, 370, 380, 390 nm). In the Visible part, the filters have a FWHM of 25 nm and a step between the bands of 25 nm (400, 425, 450, 475, 500, 525, 550, 575, 600, 625, 650, 675, 700 nm). In the last part of the near infrared spectrum the filters still have a FWHM of 25 nm (750, 800, 850, 900, 950, 1000, 1050, 1100, 1150 nm), while the last filter 1200 nm has a FWHM bandwidth of 50 nm due to low light sensitivity of the sensor. The remaining filters from the 28 band-pass described here, are one that covers all the visible (400 nm-700 nm) and last the short pass UV filter (<400 nm).

In a preferred embodiment, the camera lens mount is an objective lens mount (C-mount). This mount was selected because there is a massive variety of objective lenses in the market with this mount. In this way, the user has the opportunity to select an objective lens that best suits best his/her needs.

In a preferred embodiment, the motor is a DC motor. The motor and motor controller should be selected based on their torque, speed and accuracy. In a preferred embodiment, the DC motor with encoder and internal gears was selected providing constant knowledge of the accurate angular position of the motor, and thus of the filter carousel.

The term "comprising" whenever used in this document is intended to indicate the presence of stated features, integers, steps, components, but not to preclude the presence or addition of one or more other features, integers, steps, components or groups thereof.

The above described embodiments are combinable.

The following claims further set out particular embodiments of the disclosure.

The invention claimed is:

1. A spectral camera, comprising:
an image sensor;
a camera lens; and
a rotatable filter carrousel comprising a plurality of spectral filters arranged around a cylindrical surface,
wherein the image sensor is arranged within the filter carrousel to capture images incident through one of the spectral filters, said one of the spectral filters being interchangeable by rotation of the filter carrousel;
wherein the spectral filters are arranged tangentially around the cylindrical surface and are fixed within individual niches or holes of the cylindrical surface by a filter stop.

2. The spectral camera according to claim 1, wherein the interchangeable spectral filter is placed in the optical path of the camera between the image sensor and the camera lens.

3. The spectral camera according to claim 1, wherein the camera lens is interchangeable and is placed outside the filter carousel.

4. The spectral camera according to claim 1, further comprising: a camera lens mount placed outside the filter carousel for interchangeably mounting the camera lens, the camera lens mount being a C-mount.

5. The spectral camera according to claim 1, wherein the spectral filters are slotted within slots of the cylindrical surface.

6. The spectral camera according to claim 1, further comprising: a motor for rotating the filter carrousel.

7. The spectral camera according to claim 6, wherein the motor is configured for rotating the filter carrousel at a constant rotational speed.

8. The spectral camera according to claim 6, wherein the motor is configured for rotating the filter carrousel in a stepwise, filter by filter, motion.

9. The spectral camera according to claim 1, further comprising: a rotary encoder for providing an angular position of the filter carrousel.

10. The spectral camera according to claim 1, wherein the spectral camera is configured to capture in synchronization one image for each of the spectral filters as the filter carrousel rotates.

11. The spectral camera according to claim 10, comprising: an optical sensor or rotary encoder for determining a rotational angle of the filter carrousel for synchronizing the image capture with each of the spectral filters as the filter carrousel rotates.

12. The spectral camera according to claim 1, wherein the camera lens is an assembly of optical lenses.

13. The spectral camera according to claim 1, wherein the spectral filters are interference filters.

14. The spectral camera according to claim 1, wherein the filter carrousel comprises 10 or more spectral filters.

15. The spectral camera according to claim 1, further comprising: a laser pointer for aiding in pointing the camera at a target.

16. The spectral camera according to claim 1, comprising: bandpass interference spectral filters covering the full UV-VIS-NIR range, 350 nm-1200 nm.

17. The spectral camera according to claim 16, comprising: bandpass interference spectral filters in the ultraviolet part of the spectrum having a FWHM of 10 nm and a step between bands of 10 nm, bandpass interference spectral filters in the visible part of the spectrum having a FWHM of 25 nm and a step between bands of 25 nm, and bandpass interference spectral filters in the near infrared part of the spectrum having a FWHM of 25 nm and a step between bands of 50 nm with the last near infrared filter of 1200 nm having a FWHM bandwidth of 50 nm.

18. The spectral camera according to claim 1, comprising: bandpass interference spectral filters covering the sensitivity spectral range of the image sensor.

* * * * *